United States Patent [19]

Beller et al.

[11] 4,392,523

[45] Jul. 12, 1983

[54] PROCESS AND APPARATUS FOR CONTROLLING THE LEVEL OF A MOLTEN METAL SURFACE IN CONTINUOUS CASTING MOULDS

[75] Inventors: Manfred Beller, Illerrieden; Hans Wiedenmann, Vöhringen, both of Fed. Rep. of Germany

[73] Assignee: Wieland-Werke A.G., Metallwerke, Ulm, Fed. Rep. of Germany

[21] Appl. No.: 215,883

[22] Filed: Dec. 12, 1980

[30] Foreign Application Priority Data

Dec. 19, 1979 [DE] Fed. Rep. of Germany ....... 2951097

[51] Int. Cl.³ .................... B22D 11/16; G01N 27/72
[52] U.S. Cl. .................................. 164/453; 164/155; 164/450; 164/457; 324/239; 324/241
[58] Field of Search ............... 164/4.1, 453, 457, 155, 164/449, 450, 156; 73/299; 324/225, 204, 239, 241

[56] References Cited

U.S. PATENT DOCUMENTS

| 3,997,835 | 12/1976 | Ando et al. |
| 4,030,027 | 6/1977 | Yamada et al. |
| 4,144,756 | 3/1979 | Linder. |
| 4,186,792 | 2/1980 | Yamada et al. .................. 164/449 |

FOREIGN PATENT DOCUMENTS

| 2722214 | 12/1977 | Fed. Rep. of Germany. |
| 2722475 | 12/1977 | Fed. Rep. of Germany. |
| 2722506 | 6/1978 | Fed. Rep. of Germany. |
| 2757052 | 6/1978 | Fed. Rep. of Germany. |
| 2839953 | 3/1979 | Fed. Rep. of Germany. |
| 575443 | 2/1946 | United Kingdom. |
| 1208289 | 10/1970 | United Kingdom. |
| 1246893 | 9/1971 | United Kingdom. |
| 1295460 | 6/1972 | United Kingdom. |
| 1391029 | 4/1975 | United Kingdom. |

Primary Examiner—Gus T. Hampilos
Assistant Examiner—Jerold L. Johnson
Attorney, Agent, or Firm—Ladas & Parry

[57] ABSTRACT

A process and apparatus for controlling the level of a molten metal surface in a continuous casting mould uses a probe located either in the molten or above the surface of the molten metal. The probe is connected to a high-frequency transmitter which is arranged to induce voltages in each of two secondary receiver-coils, the receiver-coils being in coupling relationship with a compensating coil and a further coil connected to the probe. The receiver-coils are connected in opposition to one another so that a difference voltage of zero is arranged to be produced when the molten metal surface is at the required level but that the difference voltage is used, when departing from zero, for control purposes of the height of the molten metal surface.

20 Claims, 6 Drawing Figures

PROCESS AND APPARATUS FOR CONTROLLING THE LEVEL OF A MOLTEN METAL SURFACE IN CONTINUOUS CASTING MOULDS

This invention relates to a process and an apparatus for controlling the level of the molten metal surface in a continuous casting mould.

It is known to sense the changes of level of a metal molten surface by using the so called eddy-current principle, i.e., by using a high-frequency alternating magnetic field to induce voltages in each of two secondary receiver-coils, the difference voltage derived from the former voltages being balanced to zero when the molten metal surface is at the required level, whilst the voltage which arises when the molten metal surface departs form the required level is employed for control purposes.

The teaching of U.S. Pat. No. 4,144,756, show that it is disadvantageous to use both a transmitter-coil and a receiver-coil since both these coils have to be located in the mould at the level of the molten metal surface. For this reason, the process using the eddy-current principle has only been suitable with a mould in which a lining composed of a non-conducting material is provided because with metal-cased continuous casting moulds (which are customarily employed) the signals are too strongly attenuated by the screening effect of the metal moulds.

It is an object of this invention to provide a process and apparatus for controlling the molten metal surface, which is capable of being used with differing types of mould, and including moulds of differing dimensions, as well as being applicable to all alloys to be cast.

According to one aspect of this invention there is provided a process for controlling the level of a molten metal surface in a continuous casting mould by sensing the changes of level of the molten metal surface by a probe located in the vicinity of the molten metal surface, said probe and a compensating coil being in coupling relationship with two secondary receiver-coils arranged for producing a high-frequency alternating magnetic field for inducing voltages in said coils, said process deriving a difference voltage from the said induced voltages, which difference voltage is balanced to zero when the molten metal surface is at the required level, but which difference voltage is used for control purposes when the molten metal surface departs from the required level, wherein all said coils are spatially separated from the mould.

According to a further aspect of this invention there is provided an apparatus for carrying out the process of said one aspect including a high-frequency transmitter, a primary coil connected to said transmitter, two secondary receiver-coils connected in opposition which are associated with said primary coil, a compensating coil and a coil connected to a probe, said compensating coil and said coil being coupled to the receiver-coils.

In the present invention the requirements relating to robustness and simplicity are fulfilled by sensing the change of level of the molten metal surface by a probe which is located in the melt or above the molten metal surface. Moreover, the probe can easily be adapted to the shape and size of the mould so that no insulating problems arise.

A further advantage of the invention is that only one channel is required for the evaluation of the difference signals, in contrast to the abovementioned prior art reference.

In addition, by coupling the probe to a system of secondary coils, advantage is taken of a transformer effect on the comparatively small input signal.

Preferably low-frequency interfering signals (in the order of magnitude of approximately 50 Hz) are filtered from the difference signal $\Delta u$. Advantageously, the magnitude of the signal (approximately 1 Hz) which is generated by the stroke-movement of the mould and is superimposed on the difference signal $\Delta U$ can be employed for determining the absolute height of the molten metal surface.

In the apparatus the probe is preferably designed as a loop of any desired shape and size (for example a circular loop or rectangular loop), which can be located on the mould, in the mould cover, on the molten metal distributor, or in the melt. Circular-section material, tubes of circular cross-section, rectangular hollow conductors or square-section bars can be used as material for the loop. The probe used with this invention has the advantage that its shape and size can be adapted to the mould in question and that it can be installed without difficulty and without expensive modification of the mould. Furthermore, temperature problems and insulation problems prevailent in the prior art, no longer occur.

The screening effect of the inner metal casing of the mould is avoided by means of the arrangement of the probe according to the invention, so that comparatively high exciting frequencies can be employed (frequency of the high-frequency transmitter: 1 kHz to 100 kHz). By this means, there is sufficient separation from the frequency range of the interfering fields (from the induction furnaces, for example) and the necessary high sensitivity is obtained.

The arrangement of a loop as a probe, on the molten metal distributor or in the melt, has the additional advantage that the effect of the stroke-movement of the mould is avoided.

Where the probe is located outside the melt, the probe preferably consists of an electrically conducting material, in particular of copper material or copper-chromium material. In such an embodiment the high-frequency transmitter has a frequency in the range 1 kHz to 10 kHz.

Where the probe which is located in the melt, refractory material is preferred for the probe, in particular chromium steel or graphite. In such an embodiment the high-frequency transmitter then has a frequency of 10 kHz to 100 kHz.

The invention will now be described in greater detail with reference to the drawings which relate to an embodiment with a probe located on the mould:

Figure 1:
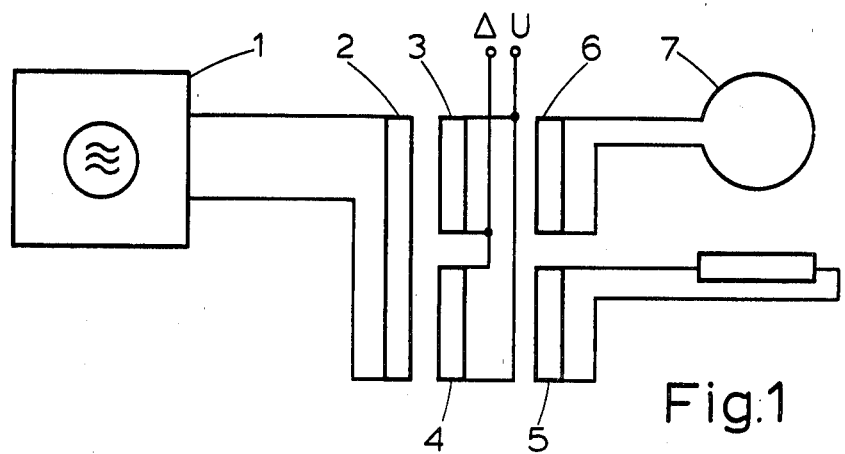
FIG. 1 shows in schematic form the principle of the process.

Referring to FIG. 1 an alternating current of predetermined frequency produced by a high-frequency transmitter 1, is passed through a primary coil 2, the alternating magnetic field associated with this current generating voltages in each of a pair of secondary receiver-coils 3, 4. The coils 3, 4 are connected in opposition so that a difference voltage Δu occurs. The alternating magnetic field similarly induces voltages in a short-circuited compensating coil 5 and in a coil 6.

Figure 2:
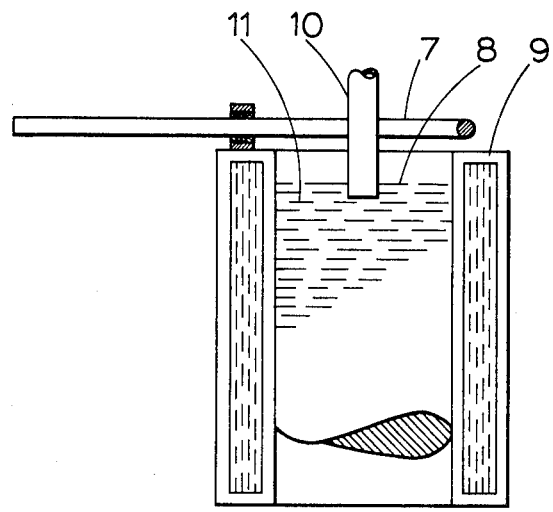
FIG. 2 shows a section through mould and probe, corresponding to the double arrow headed line A-B of FIG. 3.
Figure 3:
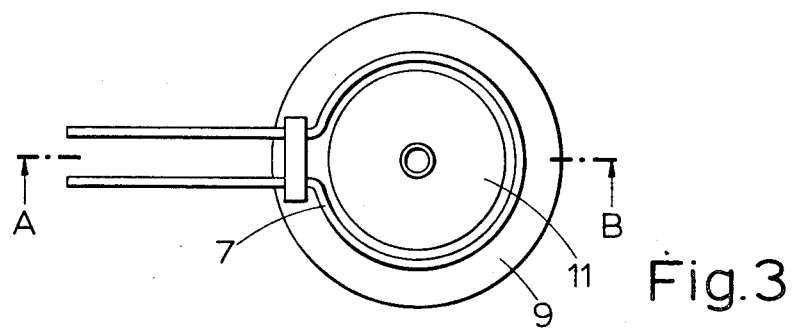
FIG. 3 shows a probe, located on the mould.

Referring now also to FIGS. 2 and 3, a probe 7 is employed to sense the molten metal surface 8 in a mould 9, the latter being provided with a molten metal distributor 10. Because of the voltage induced in coil 6 an alternating current also flows through the probe.

The alternating field associated with the alternating current due to the coil 6 induces eddy-currents in the metal melt 11, which in turn oppose, via their secondary alternating field, the exciting alternating field of the probe 7. Because of the coils 3, 6, this effect results in a change in the difference voltage Δu. Since this change is, inter alia, a function of the distance between the molten metal surface 8 and the probe 7, it can be employed for sensing the level of the molten metal surface.

By suitably arranging and dimensioning the secondary receiver-coils 3 to 6, it is possible to arrange for the difference voltage Δu to be approximately zero (preliminary balancing), this difference voltage being characterised as a complex quantity in terms of its magnitude and phase. In this arrangement, the short-circuited compensating coil 5 is connected in parallel with a resistance or reactive impedance and serves to compensate the asymmetry generated by the probe 7 and the coil 6.

As shown in particular by FIGS. 2 and 3, the probe 7 is in the form of a single circular loop although it may be made from a number of turns of wire which is installed on the mould 9, above the molten metal surface 8. The probe 7 may be mounted on an austenitic steel cover of the mould if desired or on the distributor 10. Since the coil 6 must be matched to the very low-resistance probe loop, the system of secondary coils also serves as a transformer for the comparatively small input signal.

Figure 4:
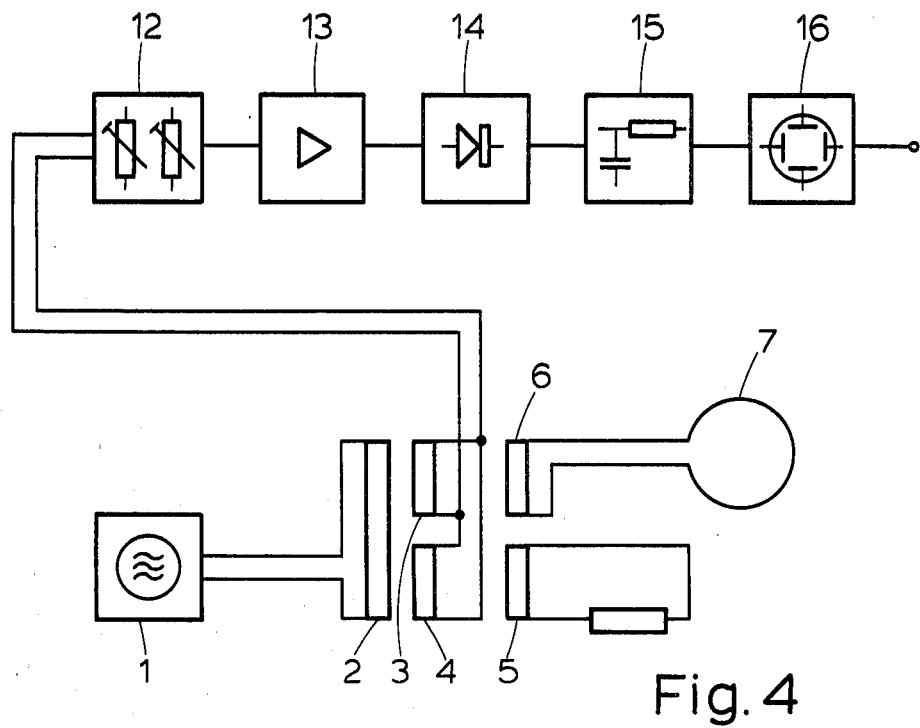
FIG. 4 shows a block circuit diagram of the measuring system.

From the block circuit diagram in FIG. 4, the difference voltage Δu is further processed in the following manner:

In the starting condition, that is to say when the molten metal surface 8 corresponds to the required level, an automatic coil balancer 12 generates a voltage having a magnitude equal to the voltage Δu, but of opposite sign potential, so that, in this case, the resulting difference signal is zero.

A molten metal surface level which departs from the required value produces a difference signal which differs from zero, this signal being amplified and demodulated in the stages 13, 14 respectively, in a manner known per se.

It is only the very low-frequency signals representative of the change in height of the molten metal surface that are passed to an oscilloscope 16 via a low-pass filter 15, the oscilloscope enabling the signals to be displayed in terms of magnitude and phase. The molten metal surface signals can additionally be separated from similar low-frequency interfering signals having a different phase relationship, by means of a phase-descriminator which is not shown.

The voltage appearing at the output of the oscilloscope 16 is used to control the level of the molten metal surface 8, the sign of this voltage corresponding to the direction of movement of the molten metal surface from a required level.

Figure 5:
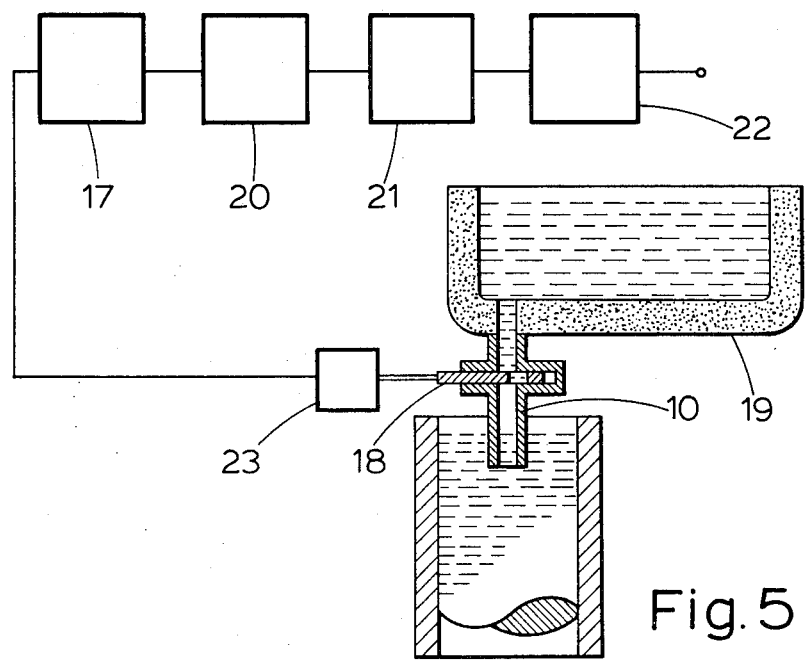
FIG. 5 shows a block diagram of the control system.

For the purpose of automatic molten metal level control (see FIG. 5) a motor 20 is coupled to a mechanical regulator 17, which actuates a slide-valve or plug-valve 18 in the receiver-hearth 19, in such a way that control can be exercised automatically or by hand (hand-regulator 23), according to choice, by engaging or disengaging the motor.

The motor 20 is driven through a transistor servo-amplifier 21, which functions as a speed controller. The connection between the molten metal surface level-measurement system of FIG. 4 and the servo-amplifier 21 forms an electronic level-controller 22 having proportional-differential (PD) behaviour. Such a control system functions very rapidly, the speed of the motor 20 being proportional to the departure from the required value, whilst the torque is independent of this value.

By means of the positive or negative voltage which is delivered by the measuring system in the event of a departure of the molten metal surface 8 from the required value, the plug or slide of the valve 18 is adjusted, in the appropriate direction, until the equilibrium condition corresponding to the required value is regained.

A control process as described above in accordance with this invention has been used for the continuous casting of circular-section copper and brass (diameter from 15 to 30 cm) over a period of several months. The high-frequency transmitter 1 employed had a frequency in the range 1 to 100 kHz. A circular loop made of circular-section copper or copper-chromium material which had a diameter of 10 mm was employed as the probe 7.

The low-pass filter had a lower frequency limit of 5 Hz.

The automatic control system functioned completely satisfactorily during the above mentioned period.

Figure 6:
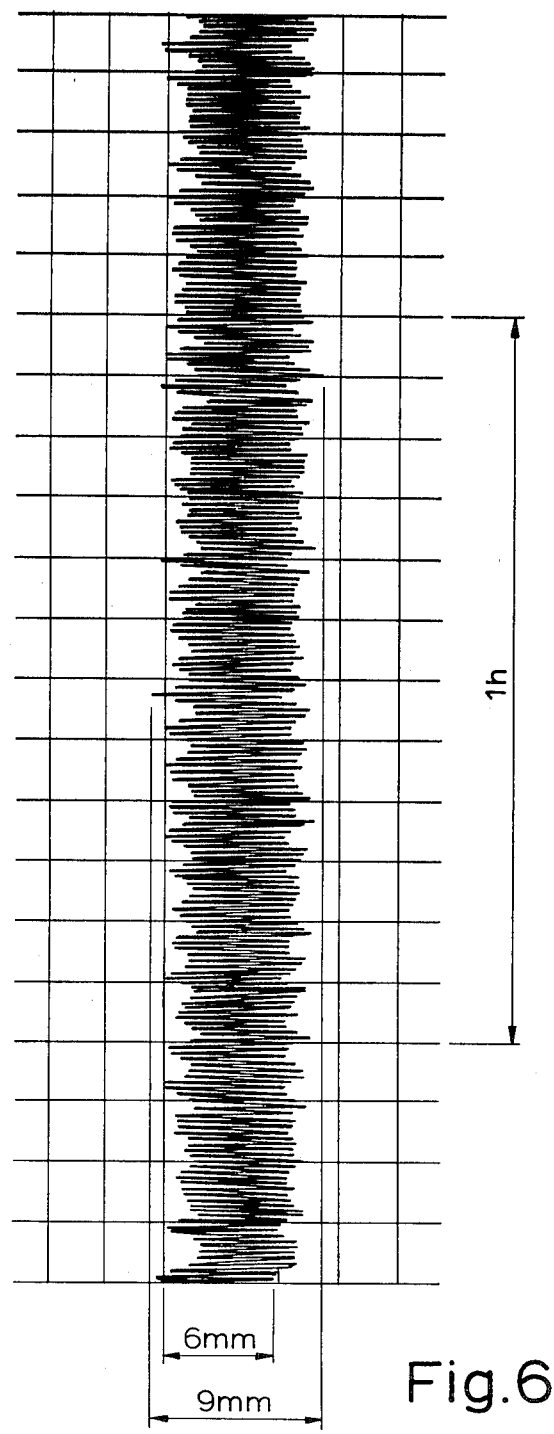
FIG. 6 shows a diagram of the molten metal surface signal during automatic control.

FIG. 6 thus shows, for example, a portion of the molten metal surface signal, recorded at the output of the measuring circuit, this portion covering approximately 1¾ hours under automatic control. The wide band corresponds to a stroke-movement of the mould having a vertical extent of 6 mm, the superimposed peaks representing the residual fluctuations (3 mm) of the molten metal surface.

We claim:

1. A process for controlling the level of a molten metal level in a continuous casting mold comprising the steps: (a) providing a continuous casting mold, (b) providing a probe in the vicinity of the mold for sensing the metal level, said probe being associated with a compensating coil, said probe and compensating coil being in coupling relation with two secondary receiver coils, all said coils being spatially separated from the mold, said secondary receiver coils being arranged to provide a voltage difference therebetween, (c) generating a high frequency alternating magnetic field to induce voltages in said secondary receiver coils, (d) filling the mold with molten metal until reaching a required level in said mold, thereby creating a voltage difference in said secondary receiver coils, (e) balancing the voltage in said secondary receiver coils to reduce the voltage difference to zero, and (f) controlling the pouring of the metal into the mold to maintain the voltage difference at zero.

2. A process according to claim 1, wherein the secondary receiver coils, the compensating coil and a coil which serves to couple the probe to the secondary receiver coils are arranged and dimensioned in such a manner that a step od balancing the voltage difference is achieved when the molten metal reaches the required level.

3. Process according to claim 2, wherein the compensating coil is electrically associated with resistances adapted to aid in balancing said voltage difference to zero.

4. Process according to claim 3, wherein said balancing step includes a final balancing to reduce the difference voltage to zero when the molten metal surface is at the required level, said final balancing being accomplished by an automatic coil balancer.

5. Process according to claim 1, including the step of filtering out low-frequency interfering signals from a voltage difference signal responsive to the voltage difference in the secondary receiver coils.

6. Process according to claim 1, wherein the step of controlling the pouring of metal into the mould is accomplished by actuating a plug-valve or slide-valve in a metal pouring vessel.

7. Process according to claim 1, wherein the probe is situated in the molten metal or above the level thereof.

8. In a continuous casting system, an apparatus for controlling the level of a molten metal surface in a continuous casting mold, said apparatus including a probe located in the vicinity of the continuous casting mold for sensing the molten metal surface, a first coil connected to said probe, a compensating coil associated with said first coil, two secondary receiver coils connected in opposition and in coupling arrangement with said first coil and said compensating coil, a primary coil associated with said secondary receiver coils and a high frequency transmitter connected to said primary coil, whereby with all said coils spatially separated from the mold, said secondary receiver coils being spaced apart and solely inductively electrically connected to said first coil and said compensating coil such that a voltage difference may be induced in said secondary receiver coils by the influence of the first coil acting on said secondary receiver coils which voltage difference will be reduced substantially to zero when the molten metal surface attains a predetermined level and the voltage difference in the secondary receiver coils may thereafter be balanced to maintain substantially zero difference thereby to control the level of the molten metal surface in the mold.

9. Apparatus according to claim 6, wherein the probe is in the form of a loop, which is locatable on a mould.

10. Apparatus according to claim 8, wherein the probe is in the form of a coil having a small number of turns which is locatable in the cover of a mould cover.

11. Apparatus according to claim 10, wherein the mould cover is made of austenitic steel.

12. Apparatus according to claim 8, wherein the probe is in the form of a loop, which is located on a distributor of the molten metal.

13. Apparatus according to claim 8, wherein the probe is in the form of a loop, which is adapted to dip into the molten metal.

14. Apparatus according to claim 9, wherein the probe consists of electrically conducting material.

15. Apparatus according to claim 14, wherein the probe consists of copper material or copper-chromium material.

16. Apparatus according to claim 13, wherein the probe consists of a refractory material.

17. Apparatus according to claim 13, wherein the probe consists of chromium steel or graphite.

18. Apparatus according to claim 8, wherein the high-frequency transmitter has a frequency range of 1 kHz to 100 kHz.

19. Apparatus according to claim 9, wherein the high-frequency transmitter has a frequency range of 1 kHz–10 kHz.

20. Apparatus according to claim 13, wherein the high-frequency transmitter has a frequency range of 10 kHz–100 kHz.

* * * * *